(12) United States Patent
Hudson

(10) Patent No.: US 6,680,902 B1
(45) Date of Patent: Jan. 20, 2004

(54) SPREADING CODE SELECTION PROCESS FOR EQUALIZATION IN CDMA COMMUNICATIONS SYSTEMS

(75) Inventor: John E Hudson, Stansted (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/488,736

(22) Filed: Jan. 20, 2000

(51) Int. Cl.[7] .......................... H04J 11/00; H04B 7/216; H04B 1/69
(52) U.S. Cl. ...................... 370/210; 370/335; 370/342; 370/441; 375/130; 375/146; 375/147; 375/229
(58) Field of Search ................. 370/203, 208, 370/209, 210, 335, 342, 320, 441, 465, 468; 375/130, 140, 146, 144, 148, 149, 150, 152, 229, 230, 147; 708/250, 251, 323; 714/728

(56) References Cited

U.S. PATENT DOCUMENTS 6,009,091 A * 12/1999 Stewart et al. ............... 370/342
6,091,757 A * 7/2000 Cudak et al. ................ 375/130
6,108,369 A * 8/2000 Ovesjo et al. ............... 375/146
6,163,524 A * 12/2000 Magnusson et al. ........ 370/208
6,400,755 B1 * 6/2002 Harris et al. ................ 375/146

OTHER PUBLICATIONS

Transmit Diversity Schemes for Broadcast Channels of TDD mode Source: Motorola.
Open loop downlink transmit diversity for TDD: STTD for TDD Texas Instruments, May 25th, 1999.

* cited by examiner

*Primary Examiner*—Chi Pham
*Assistant Examiner*—Afsar M. Qureshi
(74) *Attorney, Agent, or Firm*—Barnes & Thornburg

(57) ABSTRACT

The disclosure relates to wireless communications such as cdma systems where variable orthogonal spreading factors are employed. Code words are selected from a representation known as the orthogonal variable spreading factor (OVSF) tree, which allows code words of different length to be mixed yet remain orthogonal. The present invention provides a system whereby a subset of codes are employed whereby the bit rate can be reduced. This is of particular advantage under poor propagation conditions. Mutual interference between users is reduced.

10 Claims, 5 Drawing Sheets

The orthogonal Variable Spreading Factor Code Tree

The orthogonal Variable Spreading Factor Code Tree

SPREADING CODE SELECTION PROCESS FOR EQUALIZATION IN CDMA COMMUNICATIONS SYSTEMS

FIELD OF THE INVENTION

The present invention relates to a spreading code selection process for wireless communications systems such as CDMA systems. The present invention relates, in particular, but is not necessarily limited, to third generation TDD, and FDD cellular systems, data systems therefore and very high speed downstream internet access CDMA systems.

BACKGROUND OF THE INVENTION

Cellular wireless has enjoyed an extremely rapid growth from the 1980s. There is now an almost widespread coverage of cellular radio services in industrialised countries. In recent years there has been a similar, albeit more rapid growth in the demand for data services from systems such as the internet, intranet and other data transmission systems. People have become familiar with the advantages of both mobile wireless voice communications and web speed data communications. A demand is growing for mobile wireless data services. The demand for such services is illustrated by the extent of e-mail retrieval, web browsing etc. that already takes place in such locations as airport lounges, hotel lobbies, company conference rooms, etc.

Data traffic is assymmetric, in contrast with that voice traffic. A far greater data rate is necessary for a down link from a wireless access point to a subscriber terminal than that required for of the reverse link (or uplink).

One proposed wireless data system Is the High speed data (HSD) system which provides a high speed, high capacity wireless technologies compatible with CDMA networks for data services. It is intended that the HSD system will require minimal network and spectrum resources. The proposed HSD system provides a shared resource architecture rather than a circuit switched system whereby network, spectrum and air-link resources are minimised.

HSD follows on from existing CDMA technologies such as the IS-95 systems. The RF characteristics of IS-95 are examined whereby operators may make evolutionary changes to their existing IS-95 system. Existing network may be retained, i.e. components cost levels may be reduced by the continued use of existing technology components and devices. Some HSD proposals decouple data services from voice services: rather than providing an equal grade of services to all users. HSD proposes to allocate each user a maximum data rate possible, dependant upon application requirements and wireless channel conditions.

In the TDD mode of UTRA, as standardised in the $3^{rd}$ generation partnership (3GPP) the downlink channels can use one code with a spreading factors of 1, 2, 4, 8, 16. The parallel spreading factors are orthogonal and FIG. 1 represents an orthogonal variable spreading factor (OVSF). This allows the possibility of mixing the spreading factors if a user has several different channels open simultaneously. Prior to this the SF would be fixed at 16. Control signals will use their own fixed spreading factors, irrespective of the SF chosen for the data.

A further proposal is that certain mixed spreading factors can be employed whereby a "multicode" extension can be employed which allows one user to have several code words in order to offer a fine grained set of bit rates.

In the situation where all branches of the orthogonal spreading factor (OVSF) tree are in use, given that the simultaneous use of high and low SF's on the same branch is forbidden due to non-orthogonality, the optimum down-link receiver is essentially the zero-forcing (ZF) filter or its MMSE variant. If some branches of the OVSF tree are not in use then the ZF solution is suboptimum and higher CNR can be developed by using a ZF solution optimised for the few spreading codes with the highest common SF. Block based solutions to the uplink problems in TDD are essentially the same as the down-link case though each user has a different channel impulse response which Increases the work load.

It has been shown that the uplink FDD component of CDMA can be equalised and multiple access interference cancelled using what is essentially a TDD algorithm. In order to do this it was assumed that the short scrambling codes option would be used and the block equations are written out with a block size equal to the scrambling code length of 256 bits, which, whilst giving a high work load, is practicable. With some numerical Improvements to some known methods it becomes possible to consider applying a least squares linear solution for the long scrambling code FDD uplink option also. The resources available for solving least squares linear equations are matrix inversion, Cholesky triangularisation and back substitution, block FFT's, circulants and pseudoinverse methods. However there are unlimited ways for combining theses methods and for factoring and partitioning of the sets of equations in order to get down to the irreducible matrix which must be inverted.

Code words are selected from the orthogonal variable spreading factor (OVSF) tree which allows code words of different length to be mixed yet remain orthogonal. If a code passes through a node A in this tree ten no other shorter code word can be used which passes through node A. Thus when the code word $C_{4,0}=\{1,1,1,1\}$ is in use, another user would be allowed to use word $C_{4,1}=\{1,1,-1,-1\}$ which Is orthogonal but another user would not be allowed to use word $C_{2,0}\{1,1\}$ which, if repeated twice: $\{1,1\},\{1,1\}$, would not be orthogonal to $C_{4,0}$.

Equalisation in terminals is common for the TDD mode of CDMA as it enhances BER performance and can increase the spectral efficiency. Low cost DSP equalisers are available for TDD systems. There are several types of equaliser which have low work load and are suitable for use in battery powered terminals but which can only provide a restricted DSP capability due to battery power drain considerations. These are:

(i) Cholesky factorisation of the channel impulse response autocovariance matrix. This factorisation is efficient when the autocovariance matrix is strongly banded (associated with low dispersion channels). After matrix factorisation the least squares filter equations are solved by back substitution as usual in the Cholesky method.

(ii) Decision feedback equaliser (DFE). This uses a combination of forward FIR filtering, a threshold decision device, and a feedback filter and is commonly used in FDMA applications such as the US $2^{nd}$ generation cellular phone receivers and telephone modem equalisers.

(iii) Zero-forcing filter. Here an FIR fitter is synthesised which equalises the channel dispersion for a finite time span about the origin. For an n-tap FIR filter solution to a set of linear equations will always form a weight set such that the convolution of the sample channel impulse response $h_k$ and the filter $w_k$ will have a combined impulse response which is zero at n−1 arbitrary points and has unit response at k=0.

(iv) The Wiener least squares filter. This is a modified inverse filter which controlled the white noise response of the filter, ie. the undesired enhancement of thermal noise from the antenna. If the discrete frequency response of the channel is $H_k$ and the thermal noise variance is $\sigma^2$ then the Wiener filter frequency response is $$W_k = \frac{H_k^*}{|H_k|^2 + \sigma^2}$$

A Fast Fourier transform can be used to form this solution with low average work load and this technique is disclosed in a separate patent application, filed concurrently with this application.

In general least squares solutions such as (i) and (iv) are better than algebraic solutions such as zero forcing solutions and give better BER performance. The optimal least square filter is a function of the number of code words in use and their spreading factors. For example a LS filter selected to be optimum for use with a subset of the codes, as is common in $2^{nd}$ generation CDMA systems, is different from one which is optimum for the case that all codes are in use at the same time. It Is also much more complicated to compute the filter coefficients for use with a code subset and a matrix solution similar to (i) as is necessary for one in which all the spreading codes are explicitly written into the mathematical equations. However it can be shown that when all codes are in use the simpler Wiener filter (iv) is an optimum solution. Presently there exists a problem associated with selecting codes and the complexity associated with equalisation which requires expensive processing power and of course has attendant potential power consumption issues.

OBJECT OF THE INVENTION

The present invention seeks to provide an Improved method of selecting codes for equalisation in communication systems where variable orthogonal spreading factors are employed. The present invention also seeks to provide an associated equaliser for CDMA communications systems.

SUMMARY OF THE INVENTION

In accordance with a first aspect of the Invention, there is provided a communications system wherein signal transmissions are subject to orthogonal variable spreading factors which factors enable codes to be selected and which factors can be described by an orthogonal variable spreading factor (OVSF) tree characterised in that a subset of spreading codes may be employed in a transmission, which subset of codes pass through a common node In the OVSF tree.

Conveniently the signals can be transmitted In time division duplex mode (TDD) or frequency division duplex mode (FDD). The communications system is operable to provide data, and/or voice signals.

In accordance with a second aspect of the Invention there is provided a synchronous CDMA transmitter wherein signal transmissions are subject to orthogonal variable spreading factors which factors enable codes to be selected and which factors can be described by an orthogonal variable spreading factor (OVSF) tree characterised in that subset of spreading codes may be employed in a transmission, which subset of codes pass through a common node in the OVSF tree.

In accordance with a third aspect of the invention, there is provided a method of operating a CDMA wireless communications system wherein signal transmissions are subject to orthogonal variable spreading factors which factors enable codes to be selected and which factors can be described by an orthogonal variable spreading factor (OVSF) tree characterised in that a subset of spreading codes are employed in a transmission, which subset of codes pass through a common node In the OVSF tree. Thus a subset is used, instead of the full set, to reduce the bit rate under bad conditions or to reduce mutual interference between users.

The signals can be transmitted in time division duplex mode (TDD) or frequency division duplex (FDD) mode. The communications system can be operable to provide data, and/or voice signals.

In accordance with a fourth aspect of the invention, there is provided an integrated chip programmed to operate in accordance with the method of the present invention.

The present invention, thereby allows the use by the cellular system of a subset of equal length codes which pass through a common node in the OVSF tree and an associated simple equaliser.

BRIEF DESCRIPTION OF THE DRAWINGS

In order that the present invention can be more fully understood and to show how the same may be carried into effect, reference shall now be made, by way of example only, to the figures as shown in the accompanying drawing sheets wherein.

DETAILED DESCRIPTION OF THE PREFERRED EMBODIMENTS

There will now be described by way of example the best mode contemplated by the inventors for carrying out the invention. In the following description, numerous specific details are set out in order to provide a complete understanding of the present invention may be put Into practice with variations of the specific.

Figure 1:
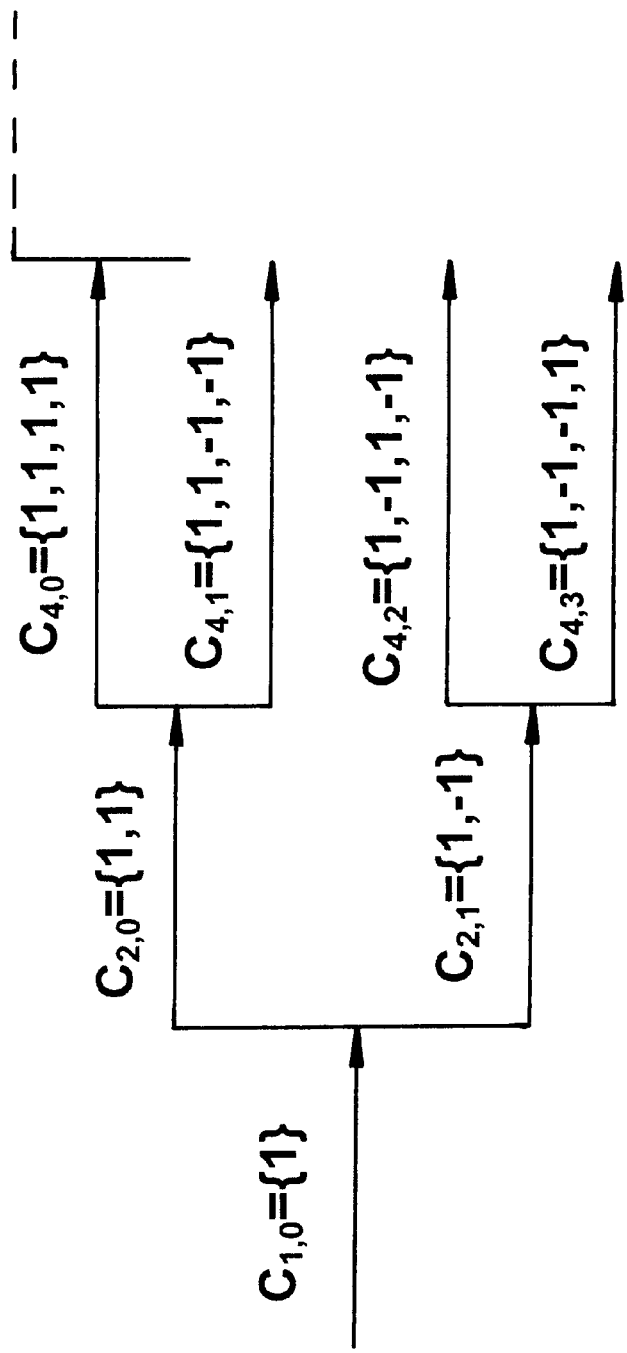
FIG. 1 shows an orthogonal variable spreading factor tree.
Figure 2:
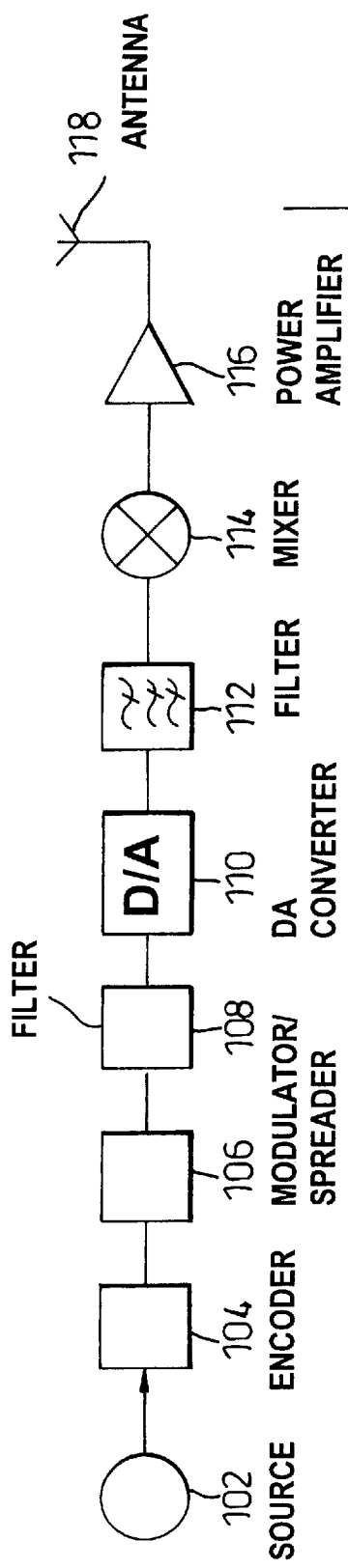
FIG. 2 shows a basic CDMA transmitter and receiver combination.
Figure 2:
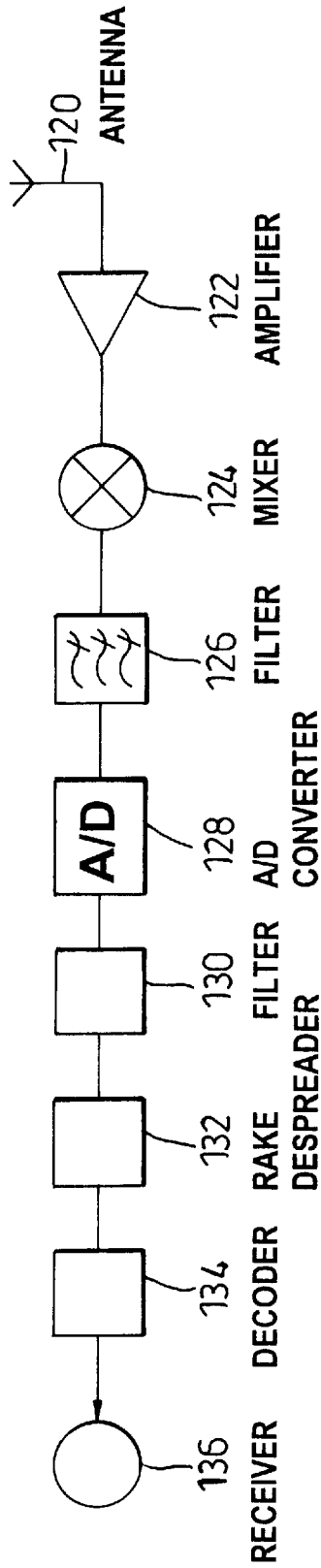

Referring now to FIG. 2 there Is shown a basic transmitter and receiver combination. The transmitter and receiver are associated with two stations A and B (denoted by respective dotted lines in FIG. 2). Each of the stations A and B could be either a base station or a mobile station, for example, in a cellular radio system. Signal source 102 generates signals which are encoded by encoder 104, such as a half rate turbo coder, which signals are modulated and subjected to CDMA spreading by modulator-/spreader 106 filtered by digital filter 108, converted to an analogue form be DA converter 110, filtered by filter 112, converted to transmission frequency by mixer 114 (although the digital filter, analogue to digital and up-converter may be implemented in one unit), amplified by power amplifier 116 and transmitted via antenna 118 The transmitted signals are received by antenna 120 of station B, amplified by amplifier 122, down converted to an intermediate frequency by mixer 124, filtered through a filter 126, converted to the digital domain by digital to analogue converter (AD) 128, filtered by digital filter 130, demodulated equaliser slicer and RAKE despreader 132, decoded by channel decoder 134 and the message is received by terminal receiving equipment 136. Note that the channel filter distorts the dispersions of the channel response in the time domain. This makes it potentially more difficult to use because of side lobes in the filter response.

Figure 3:
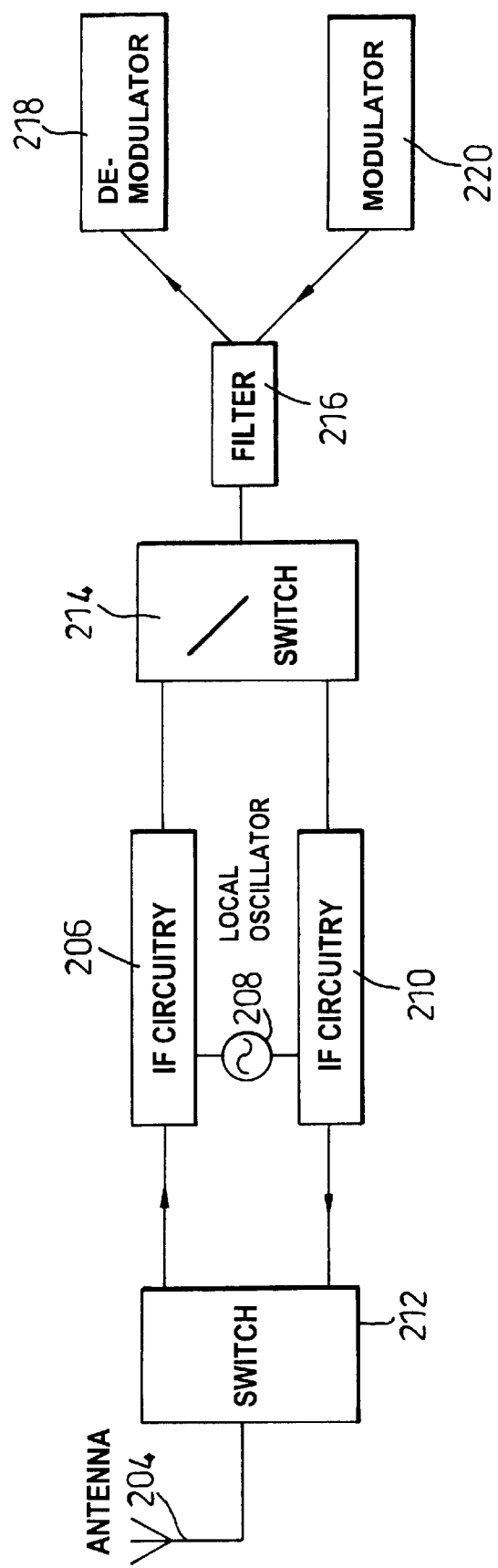
FIG. 3 shows an overview of a receiver in a TDD digital communications system.

FIG. 3 is an overview of a receiver in a TDD/FDD digital communications system in accordance with another embodiment of the invention. Referring to the Figure, the TDD/FDD receiver 202 comprises an antenna 204 operable to transmit and receive radio signals, receive-specific intermediate frequency circuitry 206, which receives a signal from a local oscillator 208 whereby signals can be mixed to intermediate frequencies. Transmit-specific intermediate frequency circuitry 210 which also receives signals from the local oscillator to convert Intermediate frequency signals to transmit frequencies. Switches 212 and 214 regulate the communications in accordance with the TDD/FDD protocol being employed. Common circuitry comprising filters are represented by reference numeral 216, which filters are connected to receive demodulators 218 and transmit modulators 220, which operate in the base band.

A first example of the invention comprises a CDMA cellular system wherein there are 16 orthogonal spreading factors. If a subset of these spreading factors is employed then, with reference to the OVSF tree, several different channels may be employed. For example if we have a maximum SF of 16 for which there are 16 available codes, but we only wish to use 8 codes to reduce the bit rate under bad propagation conditions, then the eight codes selected will all pass through the same node, such as $C_{2,0}=\{1,1\}$. The eight codes are then composed of eight repetitions of $\{1,1\}$ with the eight possible sign changes of a 8-length Walsh code:

$\{1,1\}, \{1,1\}, \{1,1\}, \{1,1\}, \{1,1\}, \{1,1\}, \{1,1\}, \{1,1\}\{1,1\}, 31 \{1,1\}, \{1,1\}, -\{1,1\}, \{1,1\}, -\{1,1\}, \{1,1\}, -\{1,1\}\{1,1\}, \{1,1\}, -\{1,1\}, -\{1,1\}, \{1,1\}, \{1,1\}, -\{1,1\}, -\{1,1\}\{1,1\}, -\{1,1\}, -\{1,1\}, \{1,1\}, \{1,1\}, -\{1,1\}, -\{1,1\}, \{1,1\}\{1,1\}, \{1,1\}, \{1,1\}, \{1,1\}, -\{1,1\}, -\{1,1\}, -\{1,1\}, -\{1,1\}, \{1,1\}\{1,1\}, 31 \{1,1\}, \{1,1\}, -\{1,1\}, -\{1,1\}, \{1,1\}, \{1,1\}, -\{1,1\}\{1,1\}, \{1,1\}, -\{1,1\}, -\{1,1\}, \{1,1\}, -\{1,1\}, -\{1,1\}, \{1,1\}, -\{1,1\}, -\{1,1\}, \{1,1\}, \{1,1\}, -\{1,1\}, -\{1,1\}, \{1,1\}, -\{1,1\}, \{1,1\}, \{1,1\}, -\{1,1\}$

The optimal least squares filter for the parallel use of this set of code words is the same as the optimal filter for a single user who selects the 2-length code $\{1,1\}$. This filter is very easy to determine. Similarly, if the codes were selected to all pass through the node $C_{2,1}=\{1,-1\}$ then the set of eight codes would be the same as the above but with a basic units of $\{1,-1\}$ in place of $\{1,1\}$. If we wished to use only four codes, then they could all pass through the node $C_{4,1}=\{1,1,-1,-1\}$ and we can build four 16-length code words as follows:

$\{1,1,-1,-1\}, \{1,1,-1,-1\}, \{1,1,-1,-1\}, \{1,1-1,-\}\{1,1,-1,-1\}, -\{1,1,-1,-1\}, \{1,1,-1,-1\}, -\{1,1,-1,-1\}\{1,1,-1, -1\}, -\{1,1,-1,-1\}, -\{1,1-1,-1\}, -\{1,1,-1,-1\}, \{1,1,-1,-1\}, -\{1,1,-1,-1\}, -\{1,1,-1,-1\}, \{1,1,-1,-1\}$

The optimal equaliser for this set of words is the same as the optimal equaliser for the case where only the code word $\{1,1,-1,-1\}$ was in use. Economics in processing power and/or a corresponding increase in speed are therefore readily available by the implementation of this coding process.

By the use in TDD CDMA, of short spreading codes (eg 8, 4, 2, 1) the implementation and use of equalisers can be simplified. Preferably the technique is combined with short sting codes (eg 16) and synchronous users (all users have time aligned codes such that all users can be equalised simultaneously, both in the up and down link directions), which further simplifies the. Implementation and use of equalisers. The coding is equally applicable to FDD-CDMA systems as TDD-CDMA systems, although the application can be dependent upon the use of scrambling codes. The invention is also applicable to mixed data/voice communications, for terminals and base stations.

The spreading code selection process can be implemented in a self-contained integrated chip, as would be available from a major semi-conductor manufacturer or a sub-routine can be installed into an ASIC chip. One issue for designers could the power consumption, but in this application such power consumption would only be a fraction of the total power requirements for DSP in a 3G terminal.

Repetition codes are a known method of extending short Walsh spreading codes to obtain increased spreading and are specified in 3G standards. However simple repetition only allows one user to occupy the short code. The present invention allows the repetition of a short code to form larger Walsh codes by the choosing of appropriate signs for the repetitions, which are themselves Walsh codes. In this way a set of long orthogonal codes can be set up.

As discussed above, the present invention is applicable to the HSD proposal which proposes a shared resource architecture. The design of HSD is centered on optimizing packet data services. It decouples data services from voice service, based on the recognition that the two services have fundamentally different requirements. For example, voice services are provided on a shared basis and aim not to incur delays. Data rates are modest, even for high quality voice services.

This results in power sharing schemes, where weaker users are allocated more power than stronger users. Physical layer designs that are designed for both voice and data services, must make compromises in their design features (including choice of frame sizes, control and signaling methods, and delay budgets) in order to accommodate both services. On the other hand, packet data systems are aimed at maximizing the sector throughput and given that different data users have various data rate requirements, it is typically not necessary to serve everyone with equal power and equal grade of service. The goal is to allocate each user the maximum data rate that he/she can accept, based on his/her application needs and the wireless channel conditions. Typically the weaker users will use a subset of larger codes formed by concatenation of a short signal code which lies at the common node in accordance with the principles of the print invention.

Optimizing voice and data on different CDMA carriers is advantageous for both services. It reduces system complexities, easing system operation and maintenance. In particular, it avoids difficult system load-balancing tasks, determining whether voice or data calls have higher priority. It is expected as wireless data traffic grows, voice and data services will necessarily be deployed on different carriers, in order to accommodate the additional traffic as well as to simplify load-balancing tasks.

Having voice and data on separate CDMA carriers does not Imply that a given system cannot support both services. In fact, a given system can have multi-carrier Access Points, where one or more carriers are dedicated to HSD, and the remaining carriers are dedicated to voice. Both voice and HSD calls may be made on a given system. However, having voice and data on different carriers means that a single call cannot simultaneously transmit voice and data.

Features such as a "Dormant Mode" allow the HSD user to go into a dormancy state with a packet data call (i.e., maintain dynamic IP address Identity, but not utilize any airlink resources). During dormancy, the user is able to place voice calls on a separate CDMA carrier. Once the voice call Is completed, the user ends dormancy by sending or receiving HSD packet data.

The HSD design can employ a time shared forward link, where only a single user is served at any instant. (No power sharing as in IS95). When being served, a subscriber station receives the full power of the cell transmitter. This allows the Access Point transmitter to operate continuously at Its maximum power output, and provides very high peak rates for subscriber stations that are in a good coverage area.

Figure 4:
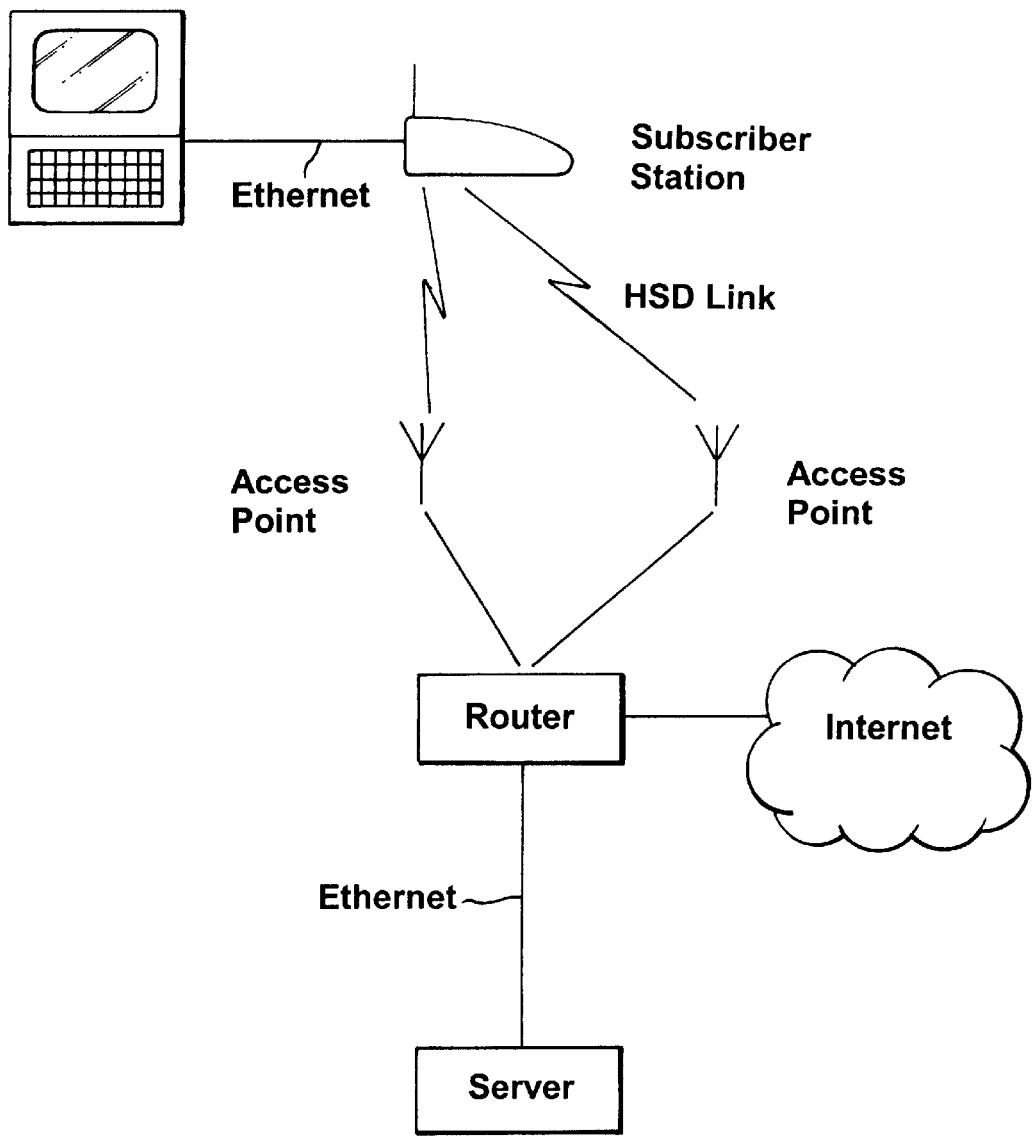
FIG. 4 shows the high level architecture of a HSD wireless data system.
Figure 5:
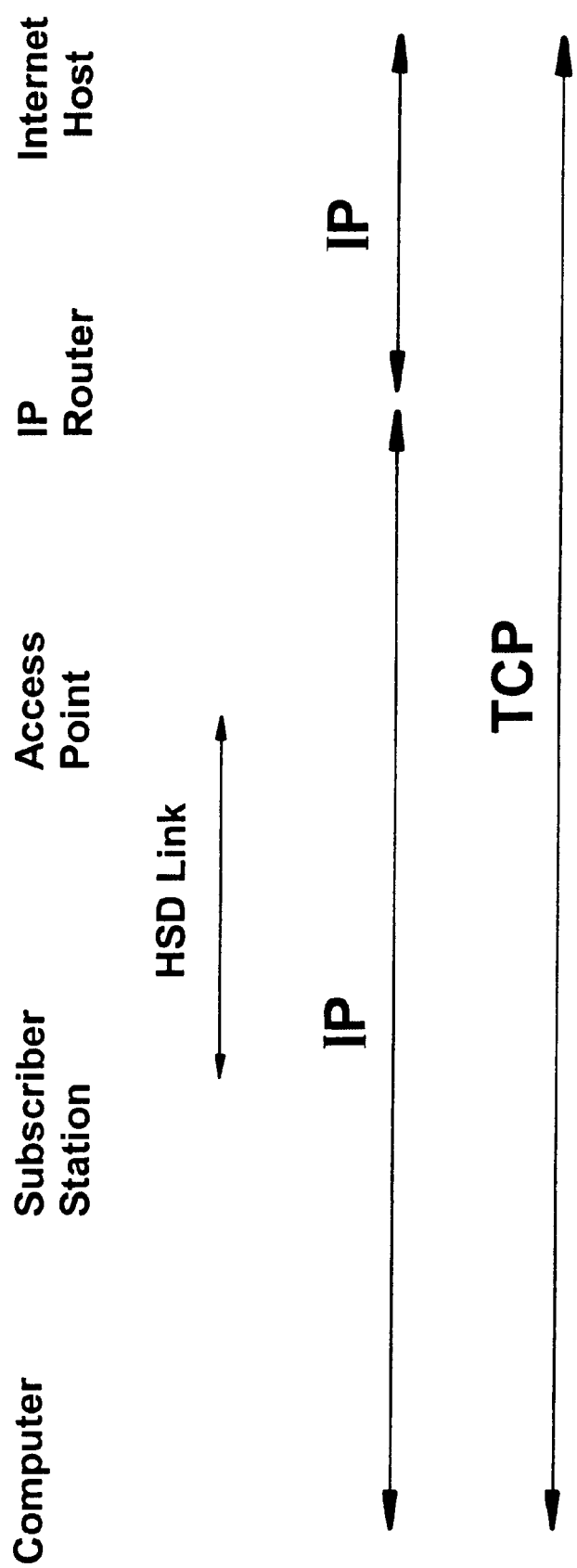
FIG. 5 shows the network elements of a HSD wireless data system.

By the use of coding and subsets of codes the HSD forward link can provide a number of different user data rates. They are chosen to sufficiently sample the range of channel conditions experienced in a typical cellular/PCS network. Referring now to FIG. 4, there is shown a high level architecture for HSD wireless data systems. The HSD-based architecture is much simplified and does not require a large switching system, in contrast to voice-capable systems. The HSD system's architecture is designed to provide high performance packet data services with minimal network resources. The network elements of such a system communicate via the protocol stack, as shown in FIGS. 5. HSD systems can employ IP-based protocols to their advantage, and therefore provide support for mainstream software applications.

HSD systems are designed to be highly interoperable with cdmaOne systems. Leveraging from the same RF characteristics as IS-95 CDMA, dual-mode IS-95/HSD subscriber stations can be provided in a compact and cost-effective manner. Dual-mode IS-95HSD devices allow users to access voice services via the IS-95 frequency carrier, while receiving data services through the HSD frequency carrier. Wireless subscibers will benefit from IS-95's excellent voice quality, as well as HSD's high performance data attributes.

What is claimed is:

1. A code division multiple access (CDMA) wireless communications system, comprising:
    a transmitter for transmitting signals to terminals on down link channels, said transmitter being arranged to select code words from an orthogonal variable spread factor (OVSF) free respectively for said down link channel signal transmissions; and
    a terminal for receiving one of said down link channel signal transmissions, said terminal including an equaliser, wherein said equaliser is arranged to select a code word that is shorter than and from the same branch of the OVSF tree as the code word selected by the transmitter for the down link channel signal transmission received by said terminal, said shorter code word enabling the equaliser to equalise said received signal.

2. A CDMA wireless communications system according to claim 1, wherein the down link channel signal transmission received by the terminal is arranged to comprise at least one of voice, non-real time data and real time data.

3. A CDMA wireless communications system according to claim 1, wherein a first terminal receives a down link channel signal transmission from the transmitter that comprises a voice signal and a second terminal receives a down link channel signal transmission from the transmitter that comprises a data signal.

4. A CDMA wireless communications system according to claim 1, wherein the transmitter is further arranged to select a code word for a down link channel signal transmission that has a spreading factor dependent on a condition of the wireless downlink channel.

5. A CDMA wireless communications system according to claim 1, wherein the transmitter is further arranged to select a code word for a down link channel signal transmission that has a spreading factor dependent on a user application associated with the terminal receiving the signal transmission.

6. A terminal for a CDMA wireless communications system, comprising:
    means for receiving a down link signal transmission from a transmitter, said down link signal having a code word selected by the transmitter from an OVSF tree associated therewith; and
    an equaliser arranged to select a code word that is shorter than and from the same branch of the OVSF tree as the code word selected by the transmitter, said shorter code word enabling the equaliser to equalise the received down link signal transmission.

7. A method of operating a CDMA wireless communications system, comprising the steps of:
    at a transmitter, selecting a code word from an OVSF tree for a down link channel signal transmission; and
    at a terminal receiving said signal transmission, selecting a code word that is shorter than and from the same branch of the OVSF tree as the code word selected by the transmitter to enable an equaliser of the terminal to equalise the received signal transmission.

8. A method according to claim 7, wherein, at the transmitter, the step of selecting a code word from the OSVF tree for a down link signal transmission includes selecting a code word having a spreading factor related to one of a down link channel condition and a user application associated with the terminal receiving the down link transmission.

9. An application specific integrated circuit (ASIC) for a CDMA wireless communications system comprising:
    means for receiving a down link signal transmission from a transmitter, said down link signal having a code word selected by the transmitter from an OVSF tree associated therewith; and
    an equaliser arranged to select a code word that is shorter than and from the same branch of the OVSF tree as the code word selected by the transmitter, said shorter code word enabling the equaliser to equalise the received down link signal transmission.

10. A computer program on a machine readable medium for implementing the method of operating a CDMA wireless communications system, comprising the steps of:
    at a transmitter, selecting a code word from an OVSF tree for a down link channel signal transmission; and
    at a terminal receiving said signal transmission, selecting a code word that is shorter than and from the same branch of the OVSF tree as the code word selected by the transmitter to enable an equaliser of the terminal to equalise the received signal transmission.

* * * * *